United States Patent
Bisiules et al.

(10) Patent No.: US 10,958,316 B2
(45) Date of Patent: Mar. 23, 2021

(54) MULTI-BAND BASE STATION ANTENNAS HAVING MIMO ARRAYS AND RELATED METHODS OF OPERATION

(71) Applicant: CommScope Technologies LLC, Hickory, NC (US)

(72) Inventors: Peter J. Bisiules, LaGrange Park, IL (US); Martin L. Zimmerman, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/915,449

(22) Filed: Jun. 29, 2020

(65) Prior Publication Data

US 2021/0006300 A1    Jan. 7, 2021

Related U.S. Application Data

(60) Provisional application No. 62/869,175, filed on Jul. 1, 2019.

(51) Int. Cl.
*H04B 7/0413* (2017.01)
*H04L 5/14* (2006.01)

(52) U.S. Cl.
CPC ............ *H04B 7/0413* (2013.01); *H04L 5/14* (2013.01)

(58) Field of Classification Search
CPC .. H04B 7/0617; H04B 7/0413; H04B 7/0697; H04B 7/024; H04B 7/0469;
(Continued)

(56) References Cited

U.S. PATENT DOCUMENTS 6,211,841 B1 *  4/2001  Smith .................. H01Q 1/246
                                                           343/797
9,653,817 B2    5/2017  Bi et al.
(Continued)

FOREIGN PATENT DOCUMENTS

WO    2017/165512    9/2017

OTHER PUBLICATIONS

"AAS Taxonomy", Nokia Siemens Networks, 3rd Generation Partnership Project (5 pages) (Oct. 10-14, 2011).
(Continued)

*Primary Examiner* — Rahel Guarino
(74) *Attorney, Agent, or Firm* — Myers Bigel, P.A.

(57) ABSTRACT

Base station antennas are provided herein. A base station antenna includes consecutive first, second, third, and fourth columns of radiating elements that are configured to transmit in a first frequency band. In some embodiments, the first and third columns are further configured to transmit in a second frequency band that is different from the first frequency band as a first MIMO pair, and the second and fourth columns are further configured to transmit in the second frequency band as a second MIMO pair. Additionally or alternatively, in some embodiments, the first and second columns are fed together and are further configured to transmit in a second frequency band as a first MIMO pair, and the third and fourth columns are fed together and are further configured to transmit in the second frequency band as a second MIMO pair. Related methods of operation are also provided.

21 Claims, 12 Drawing Sheets

(58) Field of Classification Search
CPC ....... H04B 7/0691; H04B 7/10; H04W 88/08; H04W 72/042; H04W 72/0453; H04W 72/046; H04L 1/0025; H04L 5/14; H01Q 1/246; H01Q 21/062
See application file for complete search history.

(56) References Cited

U.S. PATENT DOCUMENTS

| | | |
|---|---|---|
| 10,601,120 B2 | 3/2020 | Bisiules et al. |
| 2018/0026379 A1 | 1/2018 | Barker et al. |
| 2018/0367199 A1 | 12/2018 | Zimmerman |
| 2019/0103660 A1 | 4/2019 | Zimmerman et al. |

OTHER PUBLICATIONS

"LTE Transmission Modes and Beamforming", White Paper, Rohde & Schwarz GmbH & Co. KG (25 pages) (Jul. 1, 2015).

* cited by examiner

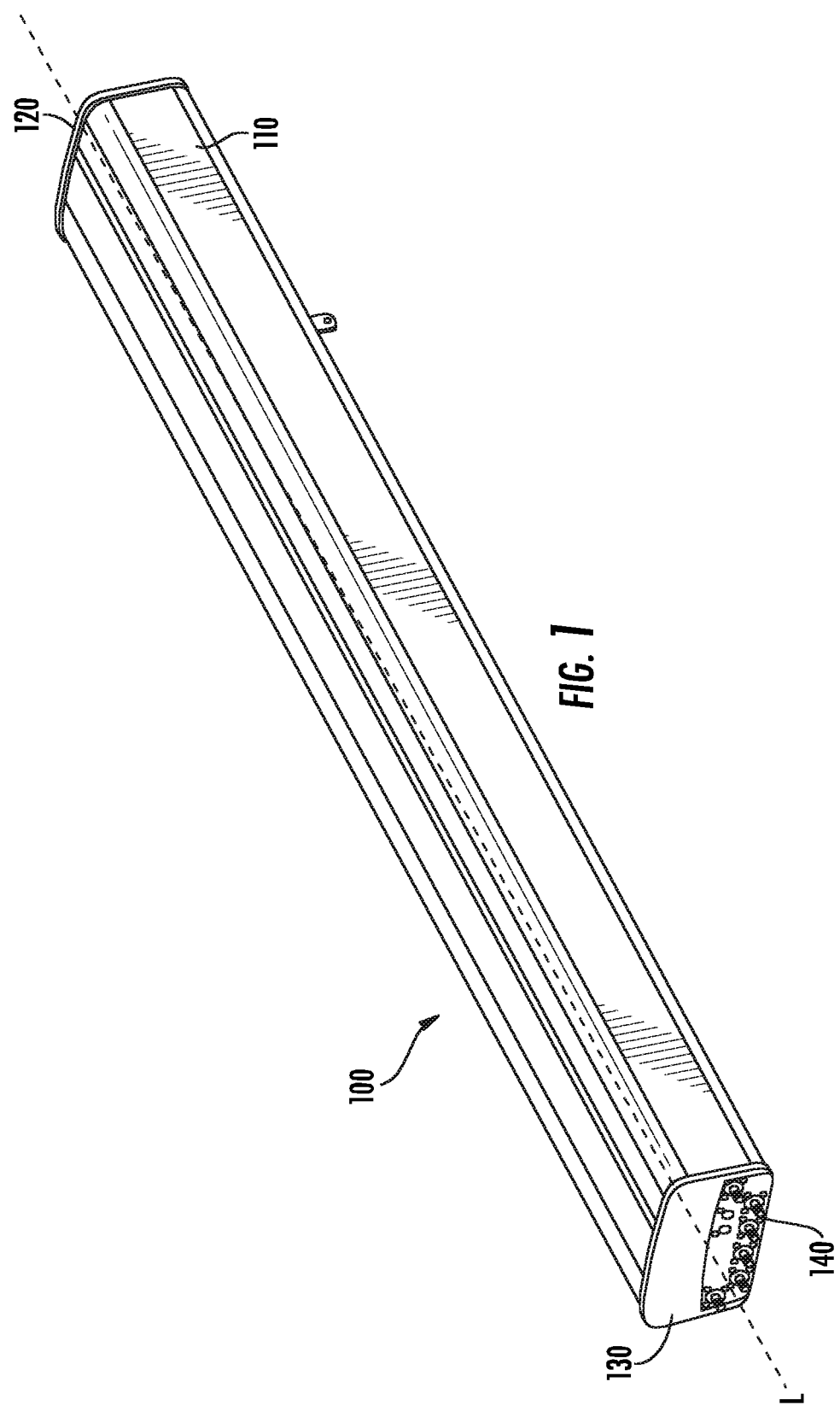

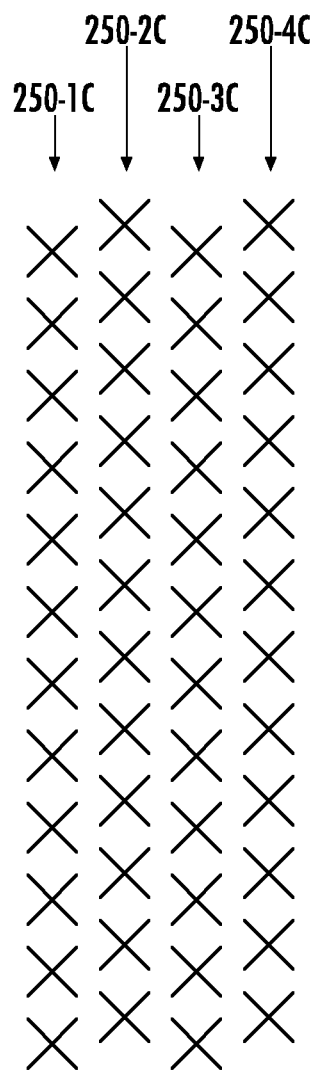
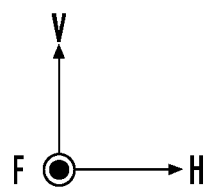
FIG. 2G

MULTI-BAND BASE STATION ANTENNAS HAVING MIMO ARRAYS AND RELATED METHODS OF OPERATION

CROSS-REFERENCE TO RELATED APPLICATION

The present application claims priority to U.S. Provisional Patent Application No. 62/869,175, filed Jul. 1, 2019, the entire content of which is incorporated herein by reference.

FIELD

The present disclosure relates to communication systems and, in particular, to multi-band base station antennas.

BACKGROUND

Base station antennas for wireless communication systems are used to transmit Radio Frequency ("RF") signals to, and receive RF signals from, fixed and mobile users of a cellular communications service. Base station antennas often include a linear array or a two-dimensional array of radiating elements, such as dipole, or crossed dipole, radiating elements.

Example base station antennas are discussed in International Publication No. WO 2017/165512 to Bisiules and U.S. patent application Ser. No. 15/921,694 to Bisiules et al., the disclosures of which are hereby incorporated herein by reference in their entireties. A base station antenna that includes many closely-spaced radiating elements may present size and performance trade-offs for the antenna. For example, radiating elements that are closer together may improve beam-forming performance, whereas wider spacing may be advantageous for multiple-input, multiple-output ("MIMO") performance.

SUMMARY

A base station antenna, according to some embodiments herein, may include consecutive first, second, third, and fourth vertical columns of radiating elements that are configured to transmit RF signals in a first frequency band. The first and third vertical columns of radiating elements may be further configured to transmit RF signals in a second frequency band that is different from the first frequency band as a first MIMO pair of non-consecutive vertical columns of radiating elements. Moreover, the second and fourth vertical columns of radiating elements may be further configured to transmit RF signals in the second frequency band as a second MIMO pair of non-consecutive vertical columns of radiating elements.

In some embodiments, the base station antenna may be configured to operate in a beam-forming mode in the first frequency band. For example, the beam-forming mode may be a time division duplex ("TDD") beam-forming mode, and the base station antenna may be further configured to operate in a frequency division duplex ("FDD") MIMO mode in the second frequency band.

According to some embodiments, the base station antenna may include first through eighth ports. The first, second, third, and fourth vertical columns of radiating elements may be electrically connected to first, second, third, and fourth port pairs, respectively, of the first through eighth ports.

In some embodiments, the base station antenna may be configured to use: the first and third port pairs together as a first four-port set of MIMO ports in the second frequency band; and the second and fourth port pairs together as a second four-port set of MIMO ports in the second frequency band. The first and third port pairs may be configured to transmit RF signals in a first portion of the second frequency band, and the second and fourth port pairs may be configured to transmit RF signals in a second portion of the second frequency band that is different from the first portion.

According to some embodiments, the base station antenna may include: eight beam-former ports; and a unit including a plurality of RF components that are configured to electrically connect the first through fourth vertical columns of radiating elements to the eight beam-former ports and the first and second four-port sets of MIMO ports. The plurality of RF components may include a plurality of diplexers and a plurality of power dividers. Moreover, the base station antenna may be further configured to switch between: a first port configuration in which the first through fourth vertical columns of radiating elements are electrically connected to the eight beam-former ports and to the first and second four-port sets of MIMO ports; and a second port configuration in which the first through fourth vertical columns of radiating elements are electrically connected to the eight beam-former ports and only four of the MIMO ports.

In some embodiments, a center of the first vertical column of radiating elements may be spaced apart from a center of the second vertical column of radiating elements by a first distance. The center of the first vertical column of radiating elements may be spaced apart from a center of the third vertical column of radiating elements by a second distance that is about double the first distance. Moreover, the base station antenna may include a plurality of vertical columns of low-band radiating elements that are configured to transmit RF signals in a third frequency band that is lower than the first and second frequency bands. The first, second, third, and fourth vertical columns of radiating elements may include first, second, third, and fourth inner vertical columns, respectively, of mid-band or high-band radiating elements that are between the plurality of vertical columns of low-band radiating elements. The first and second frequency bands may include first and second sub-bands, respectively, of a mid-band frequency band or a high frequency band. The first distance may be equal to about half of a wavelength of the first sub-band, and the second distance may be equal to about 0.65-0.95 of a wavelength of the second sub-band.

A base station antenna, according to some embodiments, may include eight beam-former ports for RF signals in a first frequency band. The base station antenna may include four MIMO ports for RF signals in a second frequency band that is different from the first frequency band. Moreover, the base station antenna may include consecutive first through fourth vertical columns of radiating elements that are electrically connected to: first through fourth port pairs, respectively, of the eight beam-former ports; and the four MIMO ports. The first through fourth vertical columns of radiating elements may be configured to transmit RF signals in the first frequency band. The first and second vertical columns of radiating elements may be fed together and may be further configured to transmit RF signals in the second frequency band as a first MIMO pair of consecutive vertical columns of radiating elements. The third and fourth vertical columns of radiating elements may be fed together and may be further configured to transmit RF signals in the second frequency band as a second MIMO pair of consecutive vertical columns of radiating elements.

In some embodiments, the base station antenna may be configured to operate in a MIMO mode in which the four MIMO ports are the only ports used by the first through fourth vertical columns of radiating elements in the second frequency band.

According to some embodiments, the base station antenna may include: fifth through eighth MIMO ports for RF signals in the second frequency band; and consecutive fifth through eighth vertical columns of radiating elements that are electrically connected to the fifth through eighth MIMO ports. Moreover, the base station antenna may be configured to operate in a MIMO mode in which the four MIMO ports and the fifth through and eighth MIMO ports are used in the second frequency band.

In some embodiments, the first through fourth vertical columns of radiating elements may have eight or fewer radiating elements per column. Moreover, the fifth through eighth vertical columns of radiating elements may have eight or fewer radiating elements per column. The first through fourth vertical columns of radiating elements may be above, in a vertical direction, the fifth through eighth vertical columns of radiating elements.

According to some embodiments, a center of the first vertical column of radiating elements may be spaced apart from a center of the second vertical column of radiating elements by a first distance, and a midpoint between the first and second vertical columns of radiating elements may be spaced apart from a midpoint between the third and fourth vertical columns of radiating elements by a second distance that is about double the first distance.

In some embodiments, the base station antenna may include a unit including a plurality of RF components that are configured to electrically connect the first through fourth vertical columns of radiating elements to the eight beam-former ports and the four MIMO ports. Moreover, the base station antenna may be further configured to switch between: a first port configuration in which the first through fourth vertical columns of radiating elements are electrically connected to the eight beam-former ports and the four MIMO ports; and a second port configuration in which the first through fourth vertical columns of radiating elements are electrically connected to the eight beam-former ports and eight MIMO ports.

According to some embodiments, the base station antenna may include: a fifth vertical column of radiating elements that is fed together with the first and second vertical columns of radiating elements; and a sixth vertical column of radiating elements that is fed together with the third and fourth vertical columns of radiating elements.

A method of operating a base station antenna, according to some embodiments, may include transmitting RF signals in a first frequency band via consecutive first, second, third, and fourth vertical columns of radiating elements, in a beam-forming mode. Moreover, the method may include transmitting RF signals in a second frequency band that is different from the first frequency band via the first, second, third, and fourth vertical columns of radiating elements, in a MIMO mode. The transmitting in the MIMO mode may include: concurrently transmitting RF signals in the second frequency band via the first and third vertical columns of radiating elements as a first MIMO pair of non-consecutive vertical columns of radiating elements, and concurrently transmitting RF signals in the second frequency band via the second and fourth vertical columns of radiating elements as a second MIMO pair of non-consecutive vertical columns of radiating elements; or concurrently transmitting RF signals in the second frequency band via the first and second vertical columns of radiating elements fed together, and concurrently transmitting RF signals in the second frequency band via the third and fourth vertical columns of radiating elements fed together.

In some embodiments, a center of the first vertical column of radiating elements may be spaced apart from a center of the second vertical column of radiating elements by a first distance, and the center of the first vertical column of radiating elements may be spaced apart from a center of the third vertical column of radiating elements by a second distance that is about double the first distance.

According to some embodiments, the method may include receiving a command to switch between first and second port configurations of the base station antenna. The concurrently transmitting via the first and third vertical columns of radiating elements and the concurrently transmitting via the second and fourth vertical columns of radiating elements may be performed while using the first port configuration. Moreover, the concurrently transmitting via the first and second vertical columns of radiating elements fed together and the concurrently transmitting via the third and fourth vertical columns of radiating elements fed together may be performed while using the second port configuration. In the second frequency band, the first, second, third, and fourth vertical columns of radiating elements may use only four MIMO ports of the base station antenna in the second port configuration.

BRIEF DESCRIPTION OF THE DRAWINGS

FIG. 1 is a front perspective view of a base station antenna according to embodiments of the present inventive concepts.

FIG. 2G is a schematic front view of a staggered arrangement of the inner vertical columns of FIG. 2A with the outer vertical columns omitted.

DETAILED DESCRIPTION

Figure 2A:
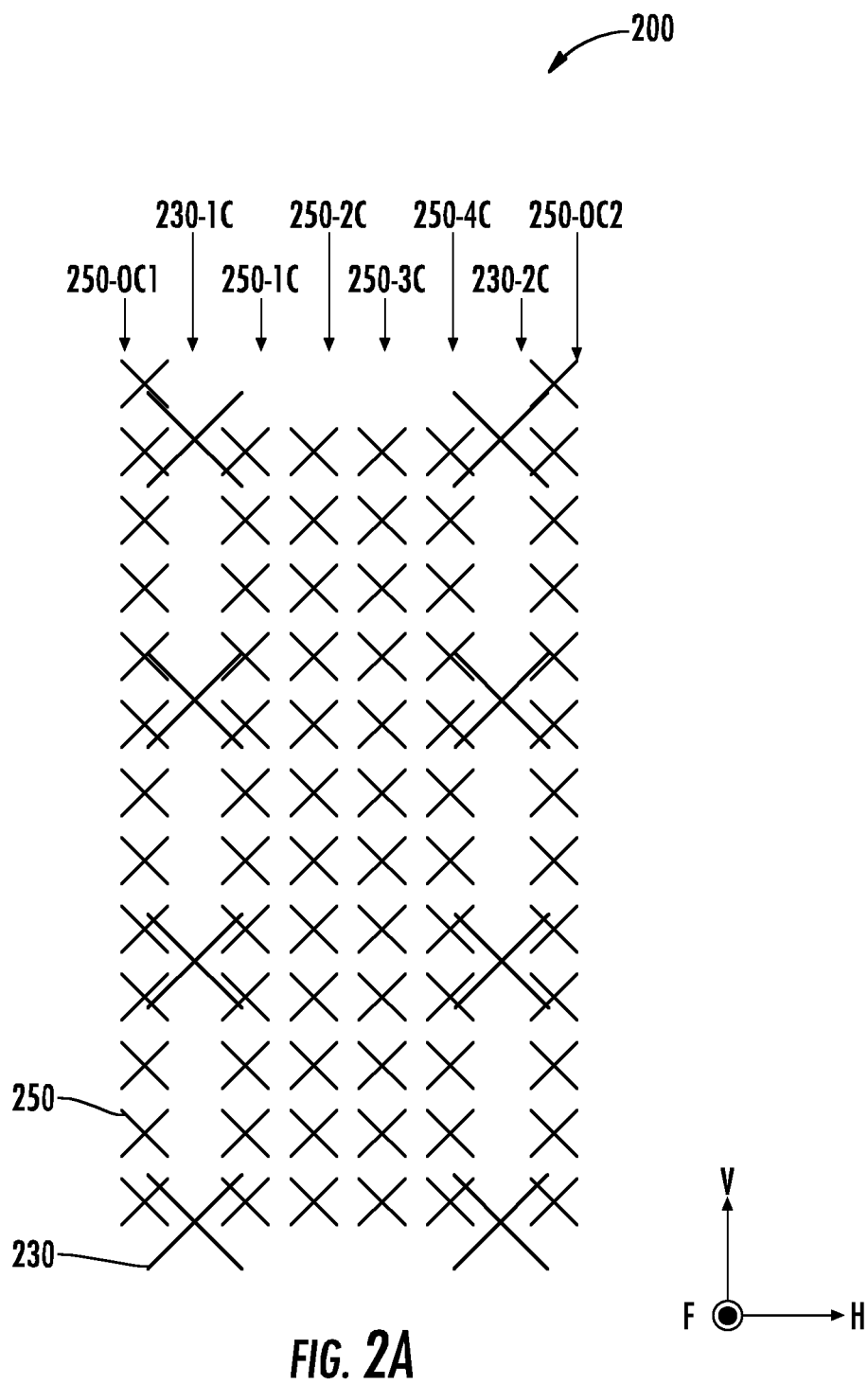
FIG. 2A is a schematic front view of the base station antenna of FIG. 1 with the radome removed.

Pursuant to embodiments of the present inventive concepts, base station antennas for wireless communication networks are provided. The enhanced-capacity capability of massive MIMO techniques for wireless communication networks makes it desirable to deploy massive MIMO antenna arrays into the existing wireless infrastructure. A frequency band that is desirable for massive MIMO operation may include all or a portion of 1695-2360 megahertz ("MHz"). Other frequency bands that may be considered for massive MIMO operation are in the 2490-2690 MHz and 3300-3800 MHz frequency bands, as well as higher frequency bands such as frequency bands in the 5.0-5.9 gigahertz ("GHz") range. Yet wireless service providers are faced with the challenge of adding additional antennas and radio heads onto existing towers to provide massive MIMO service in these frequency bands. The challenge may include the lack of availability of mounting space for an additional base station antenna array.

According to embodiments of the present inventive concepts, however, the same radiating elements may be configured to operate in both beam-forming and MIMO modes. For example, some embodiments may provide a passive FDD MIMO/TDD beam-forming antenna architecture to deliver beam-forming and MIMO using the same radiating elements. These radiating elements may be wideband radiating elements that are configured to operate in both a beam-forming frequency band and a MIMO frequency band. In particular, vertical columns of the radiating elements may be used in groups that facilitate good performance for beam-forming and MIMO.

For example, a base station antenna according to some embodiments may include four inner vertical columns of radiating elements that are coupled to eight beam-forming ports and eight MIMO ports. For MIMO, the four vertical columns may be used as two pairs of non-consecutive vertical columns. Each pair may be coupled to a different four-port set of MIMO (e.g., 4×MIMO) ports, thus collectively providing eight MIMO ports. Such use of non-consecutive vertical columns instead of adjacent (i.e., consecutive) vertical columns can result in good MIMO performance, as wider column spacing can be advantageous for MIMO because the increased column spacing further de-correlates the data streams. For beam-forming, by contrast, all four of the vertical columns may be used, as close spacing between consecutive vertical columns may be advantageous for beam-forming. The same vertical columns may thus be used for both beam-forming and MIMO at different respective horizontal-spacing distances. Specifically, the non-consecutive vertical columns in each MIMO pair may be spaced apart from each other by a distance that is double a distance between consecutive vertical columns that are used for beam-forming.

As another example, a base station antenna according to some embodiments may include four vertical columns of radiating elements that are coupled to eight beam-forming ports and four (rather than eight) MIMO ports. This antenna may provide an improved (e.g., narrowed) azimuth beamwidth for the MIMO antenna beams by feeding a first pair of consecutive vertical columns together and by feeding a second pair of consecutive vertical columns together. Because the two vertical columns of each pair are combined together, each pair is electrically connected to a different two-port MIMO set. A split in energy between the two vertical columns in each pair may be set to achieve a desired azimuth beamwidth for the MIMO antenna beams.

In some embodiments, a base station antenna may include a separate box (or other unit) that is electrically connected to all of the beam-forming and MIMO ports that are used by closely-spaced MIMO/beam-forming inner vertical columns of radiating elements. The ports and radiating elements are external to, but electrically connected to, the box. The box may include circuitry/components (e.g., diplexers, dividers, and the like) that allow a user to select desired connections, such as to select (e.g., to switch) between an eight-port MIMO configuration and a four-port MIMO configuration. The box can thus provide versatility that may be absent from antennas with fixed connections to ports.

Example embodiments of the present inventive concepts will be described in greater detail with reference to the attached figures.

FIG. 1 is a front perspective view of a base station antenna 100 according to embodiments of the present inventive concepts. As shown in FIG. 1, the base station antenna 100 is an elongated structure and has a generally rectangular shape. The base station antenna 100 includes a radome 110. In some embodiments, the base station antenna 100 further includes a top end cap 120 and/or a bottom end cap 130. For example, the radome 110, in combination with the top end cap 120, may comprise a single unit, which may be helpful for waterproofing the base station antenna 100. The bottom end cap 130 is usually a separate piece and may include a plurality of connectors 140 mounted therein. The connectors 140 are not limited, however, to being located on the bottom end cap 130. Rather, one or more of the connectors 140 may be provided on the rear (i.e., back) side of the radome 110 that is opposite the front side of the radome 110. The base station antenna 100 is typically mounted in a vertical configuration (i.e., the long side of the base station antenna 100 extends along a vertical axis L with respect to Earth).

FIG. 2A is a schematic front view of the base station antenna 100 of FIG. 1 with the radome 110 thereof removed to illustrate an antenna assembly 200 of the antenna 100. The antenna assembly 200 includes a plurality of low-band radiating elements 230 and a plurality of high-band (or mid-band) radiating elements 250. The low-band radiating elements 230 may be grouped into one or more low-band arrays. For example, two vertical columns 230-1C and 230-2C of the low-band radiating elements 230 included in the low-band array(s) may be connected to a single radio (e.g., a four-port radio) to support 4T4R MIMO in the low band, or may be connected to multiple radios (e.g., to support service in both the 700 MHz and 800 MHz frequency bands). Similarly, the high-band radiating elements 250 may be grouped into one or more high-band arrays. For example, the high-band array(s) may be an 8T8R, 16T16R, 32T32R, 64T64R, 128T128R or higher array of the high-band radiating elements 250.

The vertical columns of high-band radiating elements 250 and the vertical columns of low-band radiating elements 230 may extend in a vertical direction V from a lower portion of the antenna assembly 200 to an upper portion of the antenna assembly 200. The vertical direction V may be, or may be in parallel with, the longitudinal axis L (FIG. 1), The vertical direction V may also be perpendicular to a horizontal direction H and a forward direction F. As used herein, the term "vertical" does not necessarily require that something is exactly vertical (e.g., the antenna 100 may have a small mechanical downtilt), The radiating elements 230, 250 may extend forward in the forward direction from one or more feeding (or "feed") boards 204 (FIG. 2B) that couple RF signals to and from the individual radiating elements 230, 250 and/or from a reflector. For example, the radiating elements 230, 250 may, in some embodiments, be on the same feeding board 204. As an example, the feeding board 204 may be a single printed circuit board ("PCB") having all of the low-band radiating elements 230 and all of the high-band radiating elements 250 thereon. Cables may be used to connect each feeding board 204 to other components of the antenna 100, such as diplexers, phase shifters, or the like.

In some embodiments, the radiating elements 230, 250 may comprise dual-polarized radiating elements that are mounted to extend forwardly in the forward direction F from the feeding board(s) 204. The low-band radiating elements 230 may be arranged as two low-band linear arrays of radiating elements. Each linear array may be used to form a pair of antenna beams, namely an antenna for each of the two polarizations at which dual-polarized radiating elements are designed to transmit and receive RF signals. Moreover, the low-band radiating elements 230 may each have a generally cloverleaf or pinwheel shape in some embodiments.

The antenna assembly 200 may include a plurality of "inner" vertical columns 250-1C through 250-4C of the high-band radiating elements 250 that are between, in the horizontal direction H, the two vertical columns 230-1C and 230-2C of the low-band radiating elements 230. In some embodiments, the antenna assembly 200 may also include "outer" vertical columns 250-OC1 and 250-OC2 of the high-band radiating elements 250 that are to the outside, in the horizontal direction H, of the two vertical columns 230-1C and 230-2C, respectively. Moreover, though FIG. 2A illustrates the four inner vertical columns 250-1C through 250-4C, the antenna assembly 200 may include more (e.g., five, six, or more) or fewer (e.g., two or three) inner vertical columns of the high-band radiating elements 250.

The number of high-band radiating elements 250 in a vertical column can be any quantity from two to twenty or more. In some embodiments, the outer vertical columns 250-OC1 and 250-OC2 may each have more high-band radiating elements 250 than the inner vertical columns 250-1C through 250-4C. For example, the inner vertical columns 250-1C through 250-4C may each have twelve high-band radiating elements 250, and the outer vertical columns 250-OC1 and 250-OC2 may each have thirteen to twenty high-band radiating elements 250.

In some embodiments, the high-band radiating elements 250 may be configured to transmit and receive signals in a high frequency band comprising the 1400-2700 MHz/3300-4200 MHz/5000-5900 MHz frequency range or a portion thereof. The low-band radiating elements 230 may be configured to transmit and receive signals in a low frequency band comprising the 617-896 MHz/694-960 MHz frequency range or a portion thereof.

The high-band radiating elements 250 can, in some embodiments, be used in both a beam-forming mode and a MIMO mode. Examples of antennas that may be used as MIMO antennas and/or as beam-forming antennas are discussed in U.S. Patent Publication No. 2018/0367199, the disclosure of which is hereby incorporated herein by reference in its entirety. For example, a base station may include radios (e.g., a beam-forming radio and a MIMO radio) that each have a plurality of output ports that are electrically connected to respective ports of a base station antenna.

In the beam-forming mode, the high-band radiating elements 250 may use a first sub-band of the high frequency band. For example, the high-band radiating elements 250 may each be configured to transmit and receive signals in a frequency band comprising the 2490-2690 MHz frequency range or a portion thereof while operating in a beam-forming mode.

In the MIMO mode, different groups of the high-band radiating elements 250 may or may not be configured to transmit and receive signals in the same portion of a second sub-band of the high frequency band that is different from the first sub-band. For example, in some embodiments, high-band radiating elements 250 in a first linear array may be configured to transmit and receive signals in a first portion of a frequency band comprising the 1695-2200 (or up to 2360) MHz frequency range, and high-band radiating elements 250 in a second linear array may be configured to transmit and receive signals in a second portion of the frequency band comprising the 1695-2200 (or up to 2360) MHz frequency range that is different from the first portion. Alternatively, high-band radiating elements 250 in both linear arrays may be configured to transmit and receive signals in the same portion of the 1695-2200 MHz (or up to 2360) MHz frequency band. Different groups/arrays of the low-band radiating elements 230 may similarly have any suitable configuration.

Figure 2B:
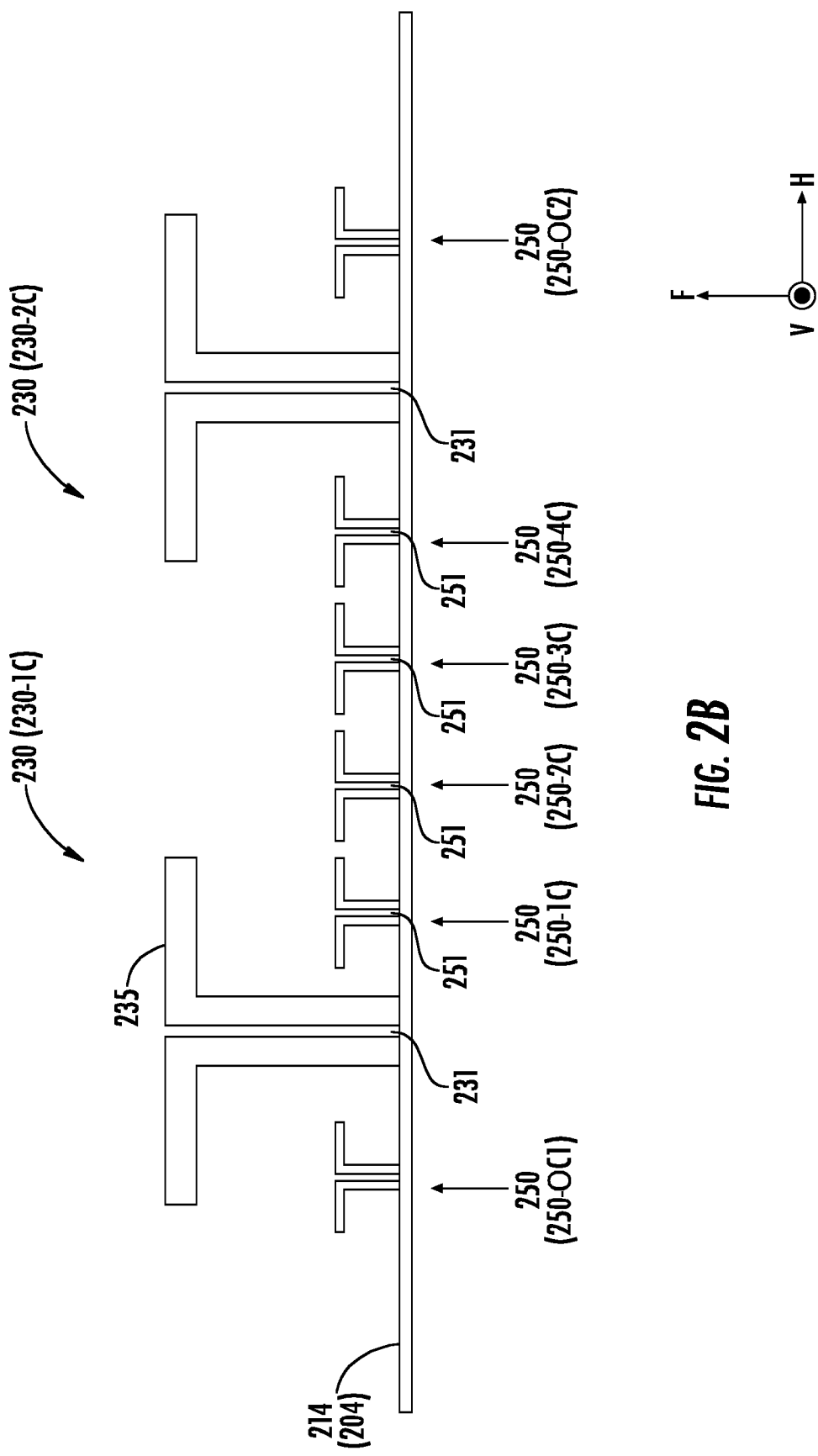
FIG. 2B is a schematic profile view of the radiating elements of FIG. 2A.

FIG. 2B is a schematic profile view of the high-band radiating elements 250 and the low-band radiating elements 230 of FIG. 2A. The profile view shows a row of the low-band radiating elements 230 along the horizontal direction H. The low-band row includes a first low-band radiating element 230 in the vertical column 230-1C and a second low-band radiating element 230 in the vertical column 230-2C.

The profile view also shows a row of the high-band radiating elements 250 along the horizontal direction H. The high-band row includes high-band radiating elements 250 in respective outer vertical columns 250-OC1 and 250-OC2, and high-band radiating elements 250 in respective inner vertical columns 250-1C through 250-4C. The inner vertical columns 250-1C through 250-4C, which have feed points 251, are between feed points 231 of the vertical columns 230-1C and 230-2C in the horizontal direction H.

As used herein, the term "feed point" may refer to the center point of a radiating element. Moreover, the term "vertical" (or "vertically") refers to something (e.g., a distance, axis, or column) in the vertical direction V.

As shown in FIG. 2B, the high-band radiating elements 250 and the low-band radiating elements 230 may extend in the forward direction F from a ground plane reflector 214. The reflector 214 may be a surface of a feeding board 204 that is perpendicular to the forward direction F or may be a metallic sheet that is mounted on the feeding board 204. The low-band radiating elements 230 may be sufficiently close to some of the high-band radiating elements 250 to have some overlap therebetween in the forward direction F. For example, a dipole arm 235 of a low-band radiating element 230 in the first vertical column 230-1C may overlap (i.e., overlie) a portion of one or more of the high-band radiating elements 250 in the forward direction F.

Various mechanical and electronic components of the antenna 100 (FIG. 1) may be mounted in a chamber behind a back side of the reflector surface 214. The components may include, for example, phase shifters, remote electronic tilt units, mechanical linkages, a controller, diplexers, and the like. The reflector surface 214 may comprise a metallic surface that serves as a reflector and ground plane for the radiating elements 230, 250 of the antenna 100. Herein, the reflector surface 214 may also be referred to as the reflector 214.

Figure 2C:
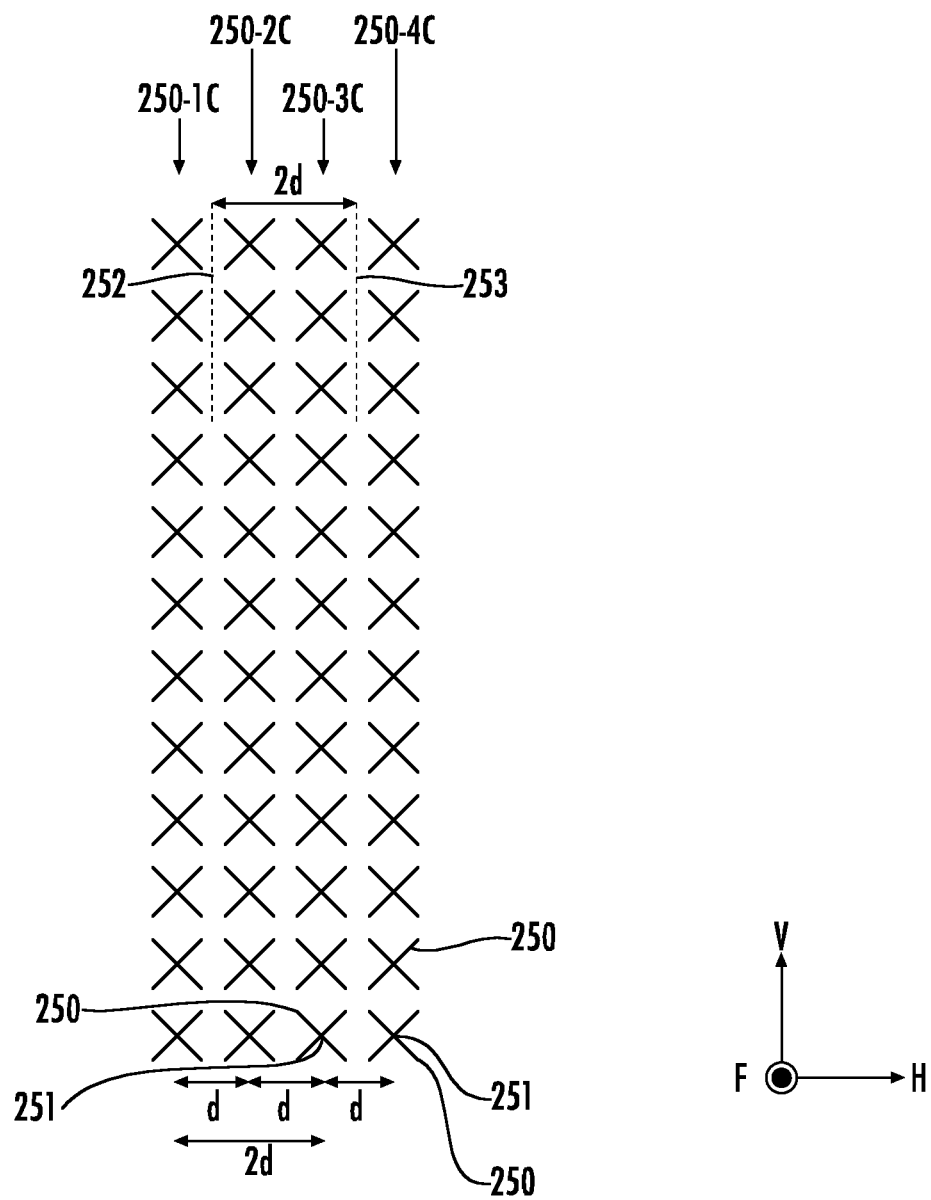
FIG. 2C is a schematic front view of the inner vertical columns of FIG. 2A with the outer vertical columns omitted.

FIG. 2C is a schematic front view of the high-band radiating elements 250 of the inner vertical columns 250-1C through 250-4C of FIG. 2A. For simplicity of illustration, FIG. 2C omits the low-band radiating elements 230 and the outer vertical columns 250-OC1 and 250-OC2 from view. Consecutive ones of the inner vertical columns 250-1C through 250-4C may be spaced apart from each other by the same center-to-center distance d. Accordingly, a center (e.g., a feed point 251) of the inner vertical column 250-3C and a center (e.g., a feed point 251) of the inner vertical column 250-4C may be spaced apart from each other in the horizontal direction H by the distance d.

Non-consecutive pairs of the inner vertical columns 250-1C through 250-4C may be spaced apart from each other by a center-to-center distance 2d that is about double the distance d. Accordingly, the center of the inner vertical column 250-3C may be spaced apart from a center of the inner vertical column 250-1C in the horizontal direction H by the distance 2d. Also, the center of the inner vertical column 250-4C may be spaced apart from a center of the inner vertical column 250-2C in the horizontal direction H by the distance 2d.

The inner vertical columns 250-1C through 250-4C may be configured to operate in different modes in different respective frequency bands (e.g., in different portions of a broader band). For example, the inner vertical columns 250-1C through 250-4C may operate in a beam-forming mode in a first sub-band of a high frequency band, and may operate in a MIMO mode in a second sub-band of the high frequency band that is different from the first sub-band. In some embodiments, the beam-forming mode may be a TDD beam-forming mode, and the MIMO mode may be an FDD MIMO mode. In particular, the inner vertical columns 250-1C through 250-4C may comprise a passive MD MIMO/TDD beam-forming antenna architecture.

In the beam-forming mode, each of the inner vertical columns 250-1C through 250-4C may radiate in a TDD scheme in the first sub-band of the high frequency band. The distance d between consecutive vertical columns may be equal to, for example, about half of a wavelength of the first sub-band (e.g., an upper end thereof) of the high frequency band. In some embodiments, in the MIMO mode, the inner vertical columns 250-1C and 250-3C may radiate concurrently (e.g., simultaneously) as a first MIMO pair of non-consecutive vertical columns, and the inner vertical columns 250-2C and 250-4C may radiate concurrently as a second MIMO pair of non-consecutive vertical columns. The distance 2d between non-consecutive vertical columns may be equal to about 0.65-0.95 of a wavelength of the second sub-band of the high frequency band.

In some embodiments, the first and second MIMO pairs may operate in different respective frequency bands (e.g., in different portions of the same sub-band of a broader band) in the MIMO mode. For example, the second sub-band of the high frequency band may include (i) a first portion in which the first MIMO pair operates and (ii) a second portion in which the second MIMO pair operates that is different from the first portion. Alternatively, the first and second MIMO pairs may operate in the same portion of the second sub-band of the high frequency band in the MIMO mode.

Figure 2D:
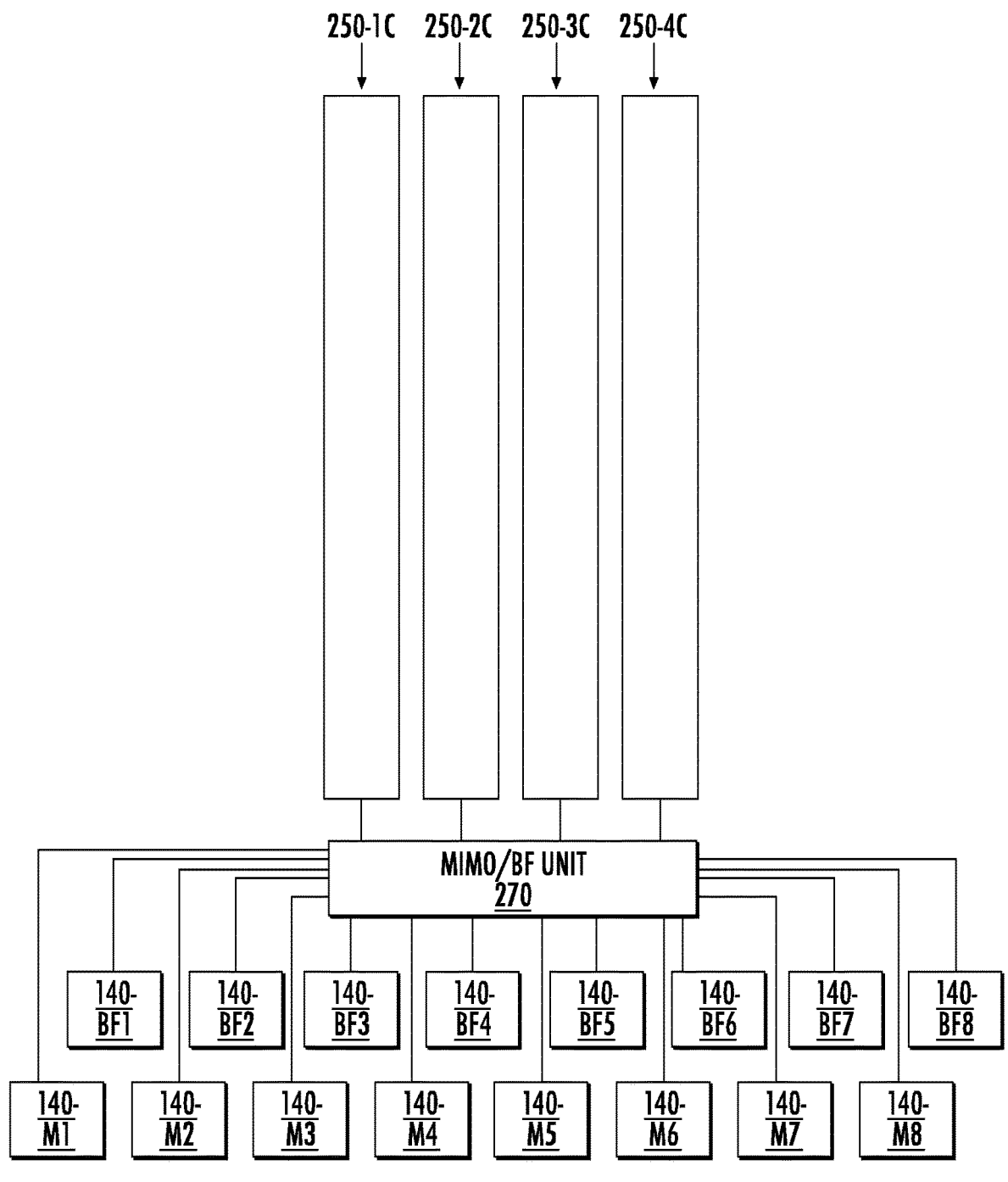
FIG. 2D is a schematic block diagram of the inner vertical columns of FIG. 2C connected to various ports.

FIG. 2D is a schematic block diagram of the inner vertical columns 250-1C through 250-4C of FIG. 2C connected to various ports 140-BF and 140-M, which may be ones of the connectors 140 (FIG. 1). Each port 140-BF and 140-M may be electrically connected to one or more high-band radiating elements 250. The ports 140-BF and 140-M may thus be referred to herein as "high-band connectors" or "high-band connection ports." Moreover, others of the connectors 140 may be low-band ports that are electrically connected to one or more low-band radiating elements 230 (FIG. 2A), or high-band ports that are electrically connected to one or more outer vertical columns 250-OC1, 250-OC2 (FIG. 2A).

The ports 140-BF may be beam-former ports for RF signals at the first sub-band of the high frequency band, whereas the ports 140-M may be MIMO ports for RF signals at the second sub-band of the high frequency band. Each of the inner vertical columns 250-1C through 250-4C may be electrically connected to a plurality of beam-former ports 140-BF. For example, each of the inner vertical columns 250-1C through 250-4C may be electrically connected to two (i.e., a respective pair of) beam-former ports 140-BF, and the inner vertical columns 250-1C through 250-4C may thus collectively be electrically connected to eight beam-former ports 140-BF.

Similarly, the inner vertical columns 250-1C through 250-4C may be electrically connected to eight MIMO ports 140-M, in addition to the eight beam-former ports 140-BF. For example, the four inner vertical columns 250-1C through 250-4C may be electrically connected to four pairs, respectively, of the eight MIMO ports 140-M. The inner vertical columns 250-1C through 250-4C may be diplexed at the sub-array level or at the column level, to be electrically connected to the eight beam-former ports 140-BF and the eight MIMO ports 140-M. As an example, a pair of diplexers (one for each polarization) may be provided for each of the inner vertical columns 250-1C through 250-4C, thus facilitating common adjustments for a particular column. Or each sub-array may split to have four ports (+/− at upper band and lower band), thus facilitating independent tilt.

As used herein, the term "port pair" may refer to two MIMO ports 140-M for respective polarizations of one of the inner vertical columns 250-1C through 250-4C or two beam-former ports 140-BF for respective polarizations of one of the inner vertical columns 250-1C through 250-4C. Accordingly, the radiating elements 250 of the inner vertical columns 250-1C through 250-4C may comprise dual-polarized radiating elements.

The base station antenna 100 (FIG. 1) may be configured to use the first pair (e.g., MIMO ports 140-M1 and 140-M2) and the third pair (e.g., MIMO ports 140-M5 and 140-M6) together as a first four-port set of 4×MIMO ports in the second sub-band (e.g., the first portion thereof) of the high frequency band. Moreover, the base station antenna 100 may be configured to use the second pair (e.g., MIMO ports 140-M3 and 140-M4) and the fourth pair (e.g., MIMO ports 140-M7 and 140-M8) together as a second four-port set of 4×MIMO ports in the second sub-band (e.g., the second portion thereof) of the high frequency band.

Alternatively, the inner vertical columns 250-1C through 250-4C may be electrically connected to eight beam-former ports 140-BF and only four MIMO ports 140-M (i.e., two MIMO ports 140-M for each pair of columns). For example, the consecutive inner vertical columns 250-1C and 250-2C may be fed together and may be configured to transmit RF signals in the second sub-band (e.g., the first portion thereof) of the high frequency band as a first MIMO pair of consecutive vertical columns of radiating elements 250. Moreover, the consecutive inner vertical columns 250-3C and 250-4C may be fed together and may be configured to transmit RF signals in the second sub-band (e.g., the second portion thereof) of the high frequency band as a second MIMO pair of consecutive vertical columns of radiating elements 250. As an example, the inner vertical columns 250-1C and 250-2C may be electrically connected to the same first feed circuit. Similarly, the inner vertical columns 250-3C and 250-4C may be electrically connected to the same second feed circuit.

In some embodiments, a MIMO/beam-former ("BF") unit 270 may be electrically connected between the inner vertical columns 250-1C through 250-4C and the ports 140-BF, 140-M. The MIMO/BF unit 270 may be a unitary (i.e., single) box, or other container/enclosure or unit (e.g., a PCB), that includes a plurality of RF components that are configured to switchably connect the inner vertical columns 250-1C through 250-4C to particular ones of the MIMO ports 140-M and the beam-former ports 140-BF. For example, the MIMO/BF unit 270 may be configured to electrically connect the inner vertical columns 250-1C through 250-4C to either eight or four of the MIMO ports 140-M, in response to whether a user selects a first port configuration or a second port configuration.

In particular, in the first port configuration, the MIMO/BF unit 270 may electrically connect the inner vertical columns 250-1C through 250-4C to (a) the eight beam-former ports 140-BF and (b) the first and second four-port sets of the MIMO ports 140-M, which may be 4×MIMO (i.e., 4x or higher) ports. In the second port configuration, the MIMO/BF unit 270 may electrically connect the inner vertical columns 250-1C through 250-4C to (a) the eight beam-former ports 140-BF and (c) only four of the MIMO ports 140-M. Accordingly, rather than using permanent/fixed RF component connections between the inner vertical columns 250-1C through 250-4C and the ports 140-BF, 140-M, some embodiments may use the MIMO/BF unit 270 to selectively provide different configurations of the ports 140-BF, 140-M.

In the second port configuration, a first pair of consecutive inner vertical columns 250-1C and 250-2C may be combined (i.e., fed together) and electrically connected to two MIMO ports 140-M. Similarly, a second pair of consecutive inner vertical columns 250-3C and 250-4C may be combined (i.e., fed together) and electrically connected to another two MIMO ports 140-M. As a result, the second port configuration may provide a four-port set of 4×MIMO ports at the second sub-band of the high frequency band. A virtual center 252 (FIG. 2C) of the combined inner vertical columns 250-1C and 250-2C may be spaced apart from a virtual center 253 (FIG. 2C) of the combined inner vertical columns 250-3C and 250-4C by the distance 2d (FIG. 2C).

Figure 2E:
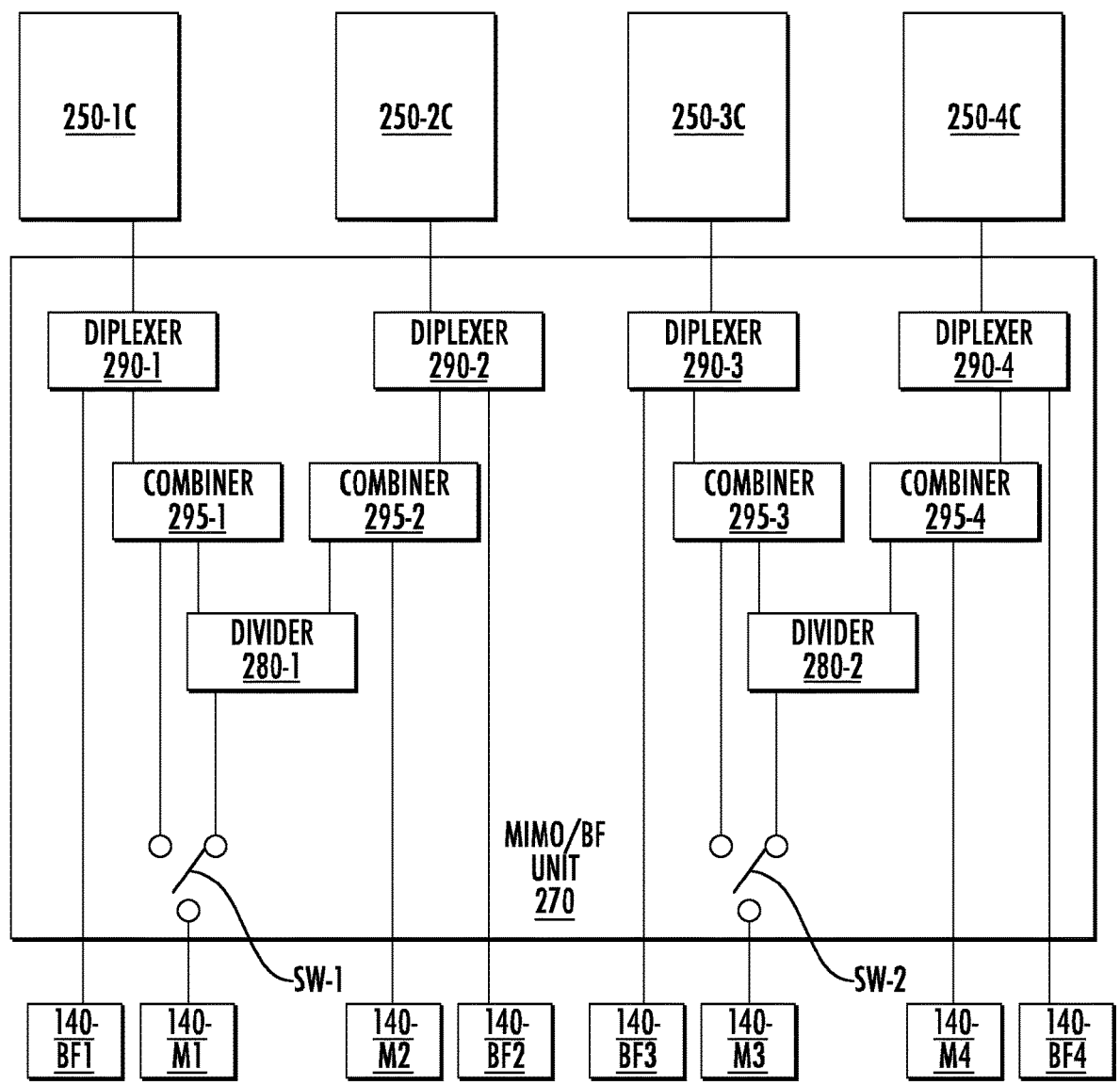
FIG. 2E is a block diagram of the MIMO/BF unit of FIG. 2D.

FIG. 2E is a block diagram of the MIMO/BF unit 270 of FIG. 2D. As shown in FIG. 2E, the MIMO/BF unit 270 may comprise a plurality of RF components, such as power dividers 280, diplexers 290, and/or combiners 295, that are electrically connected between the inner vertical columns 250-1C through 250-4C (FIG. 2D) and the ports 140-BF, 140-M (FIG. 2D). In some embodiments, the MIMO/BF unit 270 may comprise one or more switches SW that are configured to control which of the MIMO ports 140-M is connected to the inner vertical columns 250-1C through 250-4C via the RF components.

As shown in FIG. 2E, the power dividers 280, diplexers 290, combiners 295, and/or switches SW may be inside the MIMO/BF unit 270, which may be mounted anywhere inside the antenna 100. Alternatively, the MIMO/BF unit 270 may be omitted altogether, or the power dividers 280, diplexers 290, combiners 295, and/or switches SW may otherwise be outside of the MIMO/BF unit 270, such as on the front side of the feeding board(s) 204 or in a chamber behind the back side of the feeding board(s) 204. Moreover, FIG. 2E shows only one of the two polarizations that may be provided for the inner vertical columns 250-1C through 250-4C.

Figure 2F:
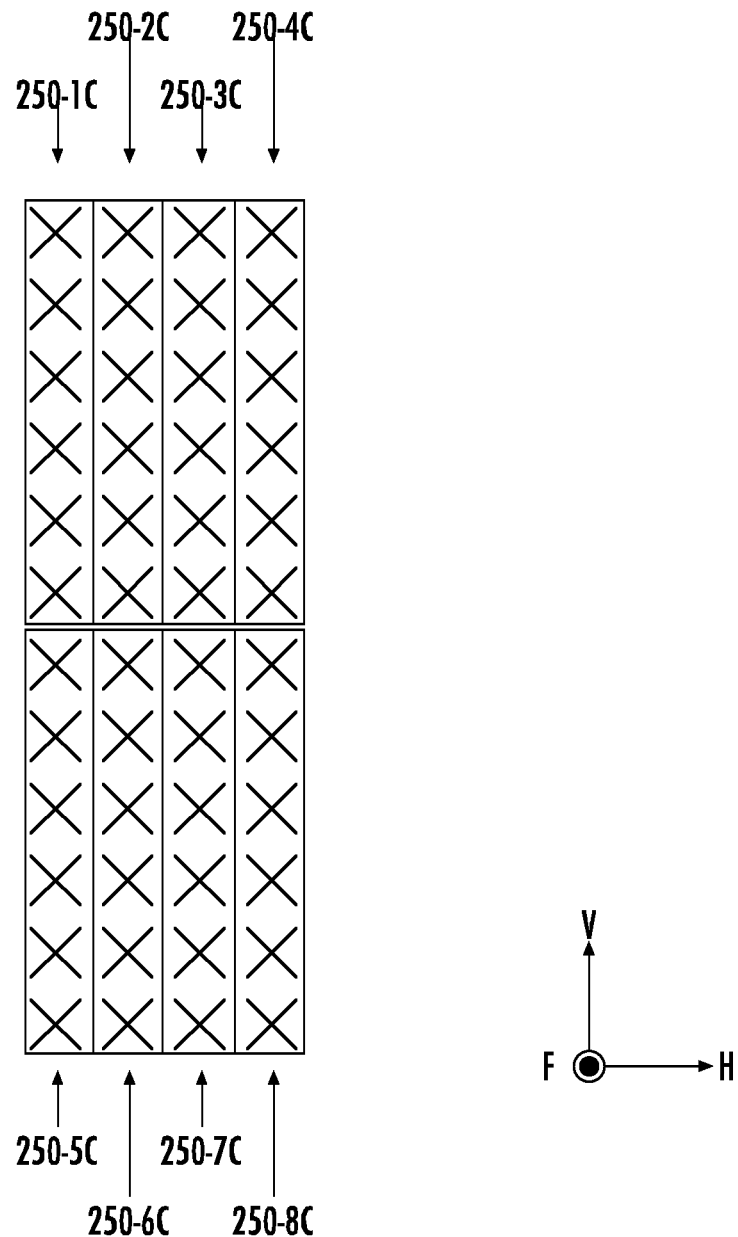
FIG. 2F is a schematic front view of the inner vertical columns of FIG. 2A with the outer vertical columns omitted in a hybrid port configuration.

FIG. 2F is a schematic front view of the inner vertical columns 250-1C through 250-4C of FIG. 2A without the low-band radiating elements 230 and without the outer vertical columns 250-OC1 and 250-OC2, in a hybrid port configuration. As shown in FIG. 2F, the inner vertical columns 250-1C through 250-4C may be divided to provide eight inner vertical columns 250-1C through 250-8C. For example, instead of the four inner vertical columns 250-1C through 250-4C having twelve high-band radiating elements 250 each, the eight inner vertical columns 250-1C through 250-8C may have six high-band radiating elements 250 each. This may facilitate a hybrid of the first and second port configurations that are discussed herein with respect to FIG. 2D.

In the hybrid port configuration, consecutive inner vertical columns 250-5C through 250-8C may be electrically connected to the MIMO ports 140-M5 through 140-M8. The inner vertical columns 250-5C through 250-8C may be below, in the vertical direction V, the inner vertical columns 250-1C through 250-4C, which may be electrically connected to the MIMO ports 140-M1 through 140-M4.

Moreover, consecutive inner vertical columns 250-1C and 250-2C may be fed together (e.g., electrically connected to the same feed circuit). Similarly, consecutive inner vertical columns 250-3C and 250-4C may be fed together, consecutive inner vertical columns 250-5C and 250-6C may be fed together, and consecutive inner vertical columns 250-7C and 250-8C may be fed together.

Accordingly, in the hybrid port configuration, consecutive ones of the inner vertical columns 250-1C through 250-8C may be combined in pairs, and the inner vertical columns 250-1C through 250-8C may collectively use eight MIMO ports 140-M at the second sub-band of the high frequency band. Moreover, though FIG. 2F shows an example in which the inner vertical columns 250-1C through 250-8C have six high-band radiating elements 250 per column, they may have fewer (e.g., two, three, four, or five) or more (e.g., seven, eight, nine, or ten) high-band radiating elements 250 per column. For example, the inner vertical columns 250-1C through 250-8C may each have eight or fewer high-band radiating elements 250.

FIG. 2G is a schematic front view of a staggered arrangement of the inner vertical columns 250-1C through 250-4C of FIG. 2A without the low-band radiating elements 230 and without the outer vertical columns 250-OC1 and 250-OC2. In particular, consecutive ones of the inner vertical columns 250-1C through 250-4C may be staggered relative to each other. Accordingly, a feed point 251 (FIG. 2C) of the inner vertical column 250-3C may be staggered relative to a corresponding feed point 251 (FIG. 2C) of the inner vertical column 250-4C in the vertical direction V.

The staggered arrangement shown in FIG. 2G may help to de-correlate the inner vertical columns 250-1C through 250-4C. The spacing of the inner vertical columns 250-1C through 250-4C in the horizontal direction H, however, may be the same as the spacing (i.e., the distances d and 2d) shown in the non-staggered arrangement in FIG. 2C. The staggered arrangement may also be combined with any of the features shown in FIGS. 2D-2F. In addition to, or as an alternative to, the staggered arrangement, one or more isolation structures/elements may be located between the inner vertical columns 250-1C through 250-4C.

Referring to FIGS. 2A-2G, the antenna 100 may include one or more of various MIMO combinations in pairs of 4T4R or 4×MIMO. For example, the inner vertical columns 250-1C and 250-3C may be individually fed (i.e., not combined) and used as a first pair of non-consecutive vertical columns for MIMO, and the inner vertical columns 250-2C and 250-4C may be individually fed (i.e., not combined) and used as a second pair of non-consecutive vertical columns for MIMO, thus providing two sets of 4×MIMO. This may result in a horizontal beamwidth in the range of roughly 65-85 degrees. As another example, the inner vertical columns 250-1C and 250-2C may be fed together (i.e., combined) to provide a narrower horizontal beamwidth, and the inner vertical columns 250-3C and 250-4C may be fed together (i.e., combined) to provide a narrower horizontal beamwidth, thus providing one set of 4×MIMO. The narrower horizontal beamwidth may be in the range of roughly 45-55 degrees.

In a further example, a first additional vertical column (e.g., the outer vertical column 250-OC1 or a duplicate of the inner vertical column 250-1C) may be provided to the left of the inner vertical column 250-1C, and a second additional vertical column (e.g., the outer vertical column 250-OC2 or a duplicate of the inner vertical column 250-4C) may be provided to the right of the inner vertical column 250-4C. The first additional vertical column and the inner vertical columns 250-1C and 250-2C may be fed together (i.e., combined) to provide an even narrower horizontal beamwidth than combining two vertical columns, and the second additional vertical column and the inner vertical columns 250-3C and 250-4C may similarly be combined, thus providing one set of 4×MIMO of even narrower beams. This even narrower horizontal beamwidth may be in the range of roughly 30-45 degrees. Accordingly, two sets of three vertical columns of radiating elements 250 may be fed together to provide an even narrower horizontal beamwidth than when each commonly-fed set only includes two vertical columns.

Figure 3A:
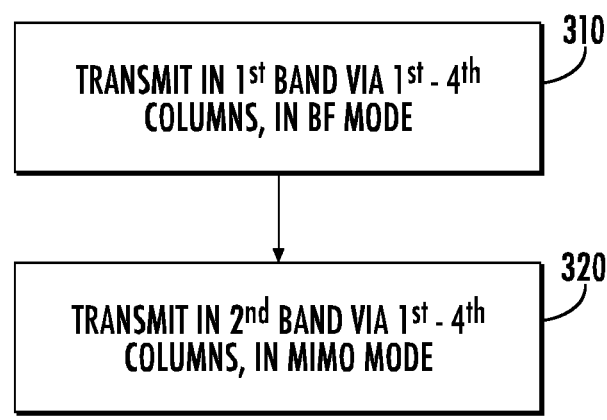
FIGS. 3A-3D are flowcharts illustrating operations of a base station antenna, according to embodiments of the present inventive concepts.

FIGS. 3A-3D are flowcharts illustrating operations of a base station antenna 100 (FIG. 1). As shown in FIG. 3A, the antenna 100 may transmit (Block 310) RF signals in a first frequency band (e.g., a first sub-band of a high frequency band) via consecutive inner vertical columns 250-1C through 250-4C (FIG. 2A), in a TDD beam-forming mode. Moreover, the antenna 100 may transmit (Block 320) RF signals in a second frequency band (e.g., a second sub-band of the high frequency band) that is different from the first frequency band via the inner vertical columns 250-1C through 250-4C, in an FDD MIMO mode that operates either sequentially or concurrently with the TDD beam-forming mode.

Figure 3B:
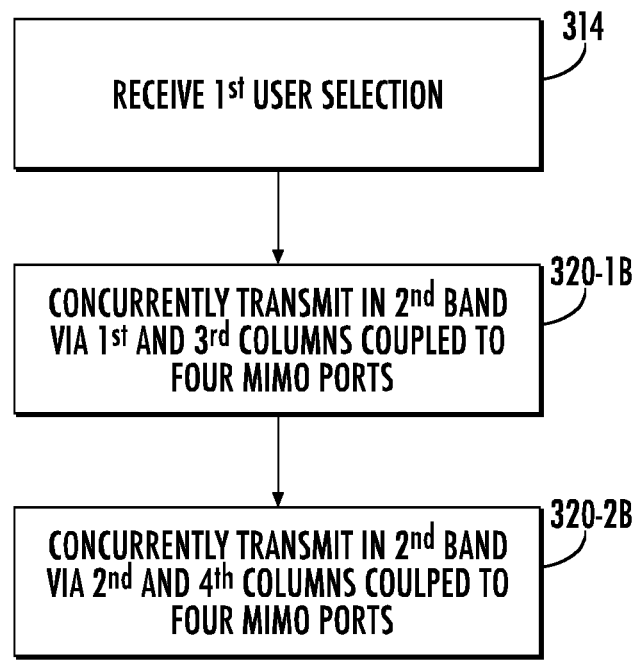

As shown in FIG. 3B, the operation(s) of Block 320 may include, for example, concurrently transmitting (Block 320-1B) RF signals in the second frequency band via the first and third inner vertical columns 250-1C and 250-3C, and concurrently transmitting (Block 320-2B) RF signals in the second frequency band via the second and fourth inner vertical columns 250-2C and 250-4C. The operation(s) of Block 320-1B may use four MIMO ports 140-M (FIG. 2D), and the operation(s) of Block 320-2B may use another four MIMO ports 140-M (FIG. 2D), thus totaling eight MIMO ports that are used by the inner vertical columns 250-1C through 250-4C in the second frequency band.

Moreover, the operations of Blocks 320-1B and 320-2B may, in some embodiments, be performed using different first and second portions, respectively, of the second frequency band. The operations of Blocks 320-1B and 320-2B may also be performed either sequentially or concurrently with each other.

In some embodiments, the operations of Blocks 320-1B and 320-2B may be performed in response to receiving (Block 314) a user selection of a first port configuration. For example, the user may transmit a signal to a MIMO/BF unit 270 (FIG. 2D) via a wired or wireless communications link.

Figure 3C:
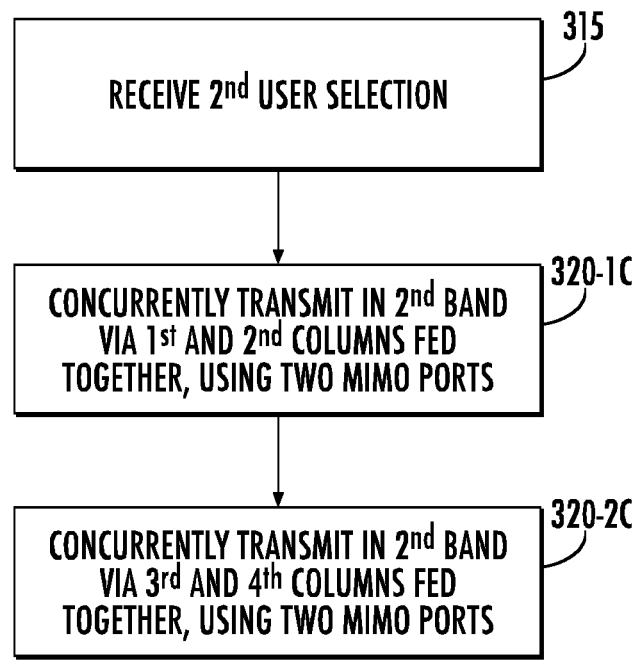

FIG. 3C shows, in another example, that the operation(s) of Block 320 may include concurrently transmitting (Block 320-1C) RF signals in the second frequency band via inner vertical columns 250-1C and 250-2C fed together (e.g., fed by the same first feed circuit), and concurrently transmitting (Block 320-2C) RF signals in the second frequency band via inner vertical columns 250-3C and 250-4C fed together (e.g., fed by the same second feed circuit). The operation(s) of Block 320-1C may be coupled to two MIMO ports 140-M (FIG. 2D), and the operation(s) of Block 320-2C may be coupled to another two MIMO ports 140-M (FIG. 2D), thus totaling only four MIMO ports 140-M that are used by the inner vertical columns 250-1C through 250-4C in the second frequency band.

Moreover, the operations of Blocks 320-1C and 320-2C may, in some embodiments, be performed using different first and second portions, respectively, of the second frequency band. The operations of Blocks 320-1C and 320-2C may also be performed either sequentially or concurrently with each other. In some embodiments, the operations of Blocks 320-1C and 320-2C may be performed in response to receiving (Block 315) a user selection of a second port configuration, which is different from the first port configuration of Block 314 (FIG. 3B).

Figure 3D:
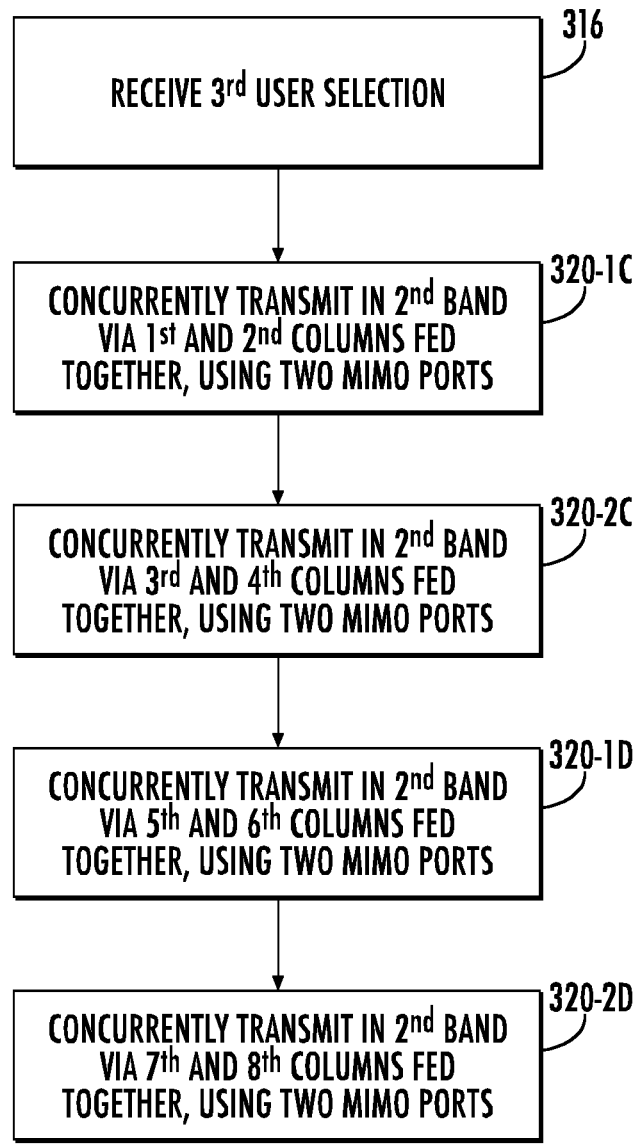

FIG. 3D shows, in a further example, that the operation(s) of Block 320 may use a hybrid of the first and second port configurations. For example, in addition to performing the operations of Blocks 320-1C and 320-2C (FIG. 3C), the antenna 100 (FIG. 1) may concurrently transmit (Block 320-1D) RF signals in the second frequency band via inner vertical columns 250-5C and 250-6C fed together (e.g., fed by the same third feed circuit), and concurrently transmit (Block 320-2D) RF signals in the second frequency band via inner vertical columns 250-7C and 250-8C fed together (e.g., fed by the same fourth feed circuit). The operations of Blocks 320-1C, 320-2C, 320-1D, and 320-2D may use respective pairs of MIMO ports 140-M (FIG. 2D), and thus may collectively use eight MIMO ports 140-M.

The operations of Blocks 320-1C, 320-2C, 320-1D, and 320-2D may, in some embodiments, be performed using different first through fourth portions, respectively, of the second frequency band. Alternatively, the operations of Blocks 320-1C and 320-1D may be performed using a first portion of the second frequency band, and the operations of Blocks 320-2C and 320-2D may be performed using a second portion of the second frequency band that is different from the first portion. Moreover, the operations of Blocks 320-1C, 320-2C, 320-1D, and 320-2D may be performed either sequentially or concurrently with each other. In some embodiments, the operations of Blocks 320-1C, 320-2C, 320-1D, and 320-2D may be performed in response to receiving (Block 316) a user selection of a third port configuration, which is different from the first port configuration of Block 314 (FIG. 3B) and different from the second port configuration of Block 315 (FIG. 3C).

In some embodiments, a user can switch between two or more of the first through third port configurations that correspond to operations of FIGS. 3B-3D. For example, the user can transmit a signal to a switch SW (FIG. 2E) of a MIMO/BF unit 270 (FIG. 2D) of the antenna 100 (FIG. 1) to command the MIMO/BF unit 270 to switch from the first port configuration to the second port configuration, or vice versa. Accordingly, operations of any two or more of FIGS. 3B-3D may be combined in a sequence in which at least one user selection (Block(s) 314/315/316) comprises a command to switch to a different port configuration.

An antenna 100 (FIG. 1) comprising closely-spaced inner vertical columns 250-1C through 250-4C (FIG. 2A) according to embodiments of the present inventive concepts may provide a number of advantages. These advantages include providing good MIMO and beam-forming performance. For example, the inner vertical columns 250-1C through 250-4C may provide a four-column array that is coupled to both FDD 4×MIMO (or higher) antenna ports and TDD beam-forming antenna ports, and does so using different horizontal-spacing distances based on whether the array is operating in a beam-forming mode or a MIMO mode.

In some embodiments, the inner vertical columns 250-1C through 250-4C may advantageously be coupled to eight MIMO ports 140-M (FIG. 2D) that are electrically connected to two pairs of non-consecutive ones of the inner vertical columns 250-1C through 250-4C for MIMO. The large number of MIMO ports 140-M and the long horizontal distance 2d (FIG. 2C) between the non-consecutive columns may provide good MIMO performance.

In some embodiments, the inner vertical columns 250-1C through 250-4C may advantageously provide antenna beams having narrowed azimuth beamwidth by combining adjacent columns. This may be accomplished by feeding the first and second inner vertical columns 250-1C and 250-2C together, and by feeding the third and fourth inner vertical columns 250-3C and 250-4C together. As a result, the inner vertical columns 250-1C through 250-4C may collectively use only four MIMO ports 140-M.

Moreover, some embodiments may advantageously provide a hybrid port configuration that (a) uses eight MIMO ports 140-M and (b) feeds pairs of inner vertical columns 250-1C through 250-8C (FIG. 2F) together. This hybrid approach provides both a large number of MIMO ports 140-M and antenna beams having narrowed azimuth beamwidth.

Any of the port configurations described herein may, in some embodiments, be selected by a user via a MIMO/BF unit 270 (FIG. 2D) that is inside the antenna 100. The unit 270 may thus advantageously improve the versatility of the antenna 100.

The present inventive concepts have been described above with reference to the accompanying drawings. The present inventive concepts are not limited to the illustrated embodiments. Rather, these embodiments are intended to fully and completely disclose the present inventive concepts to those skilled in this art. In the drawings, like numbers refer to like elements throughout. Thicknesses and dimensions of some components may be exaggerated for clarity.

Spatially relative terms, such as "under," "below," "lower," "over," "upper," "top," "bottom," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially relative descriptors used herein interpreted accordingly.

Herein, the terms "attached," "connected," "interconnected," "contacting," "mounted," and the like can mean either direct or indirect attachment or contact between elements, unless stated otherwise.

Well-known functions or constructions may not be described in detail for brevity and/or clarity. As used herein the expression "and/or" includes any and all combinations of one or more of the associated listed items.

The terminology used herein is for the purpose of describing particular embodiments only and is not intended to be limiting of the present inventive concepts. As used herein, the singular forms "a," "an," and "the" are intended to include the plural forms as well, unless the context clearly indicates otherwise. It will be further understood that the terms "comprises," "comprising," "includes," and/or "including" when used in this specification, specify the presence of stated features, operations, elements, and/or components, but do not preclude the presence or addition of one or more other features, operations, elements, components, and/or groups thereof.

That which is claimed is:

1. A base station antenna comprising:
   consecutive first, second, third, and fourth vertical columns of radiating elements that are configured to transmit radio frequency ("RF") signals in a first frequency band,
   wherein the first and third vertical columns of radiating elements are further configured to transmit RF signals in a second frequency band that is different from the first frequency band as a first multiple-input, multiple-output ("MIMO") pair of non-consecutive vertical columns of radiating elements, and
   wherein the second and fourth vertical columns of radiating elements are further configured to transmit RF signals in the second frequency band as a second MIMO pair of non-consecutive vertical columns of radiating elements.

2. The base station antenna of claim 1, wherein the base station antenna is configured to operate in a beam-forming mode in the first frequency band.

3. The base station antenna of claim 2,
   wherein the beam-forming mode comprises a time division duplex ("TDD") beam-forming mode, and
   wherein the base station antenna is further configured to operate in a frequency division duplex ("FDD") MIMO mode in the second frequency band.

4. The base station antenna of claim 1, further comprising first through eighth ports,
   wherein the first, second, third, and fourth vertical columns of radiating elements are electrically connected to first, second, third, and fourth port pairs, respectively, of the first through eighth ports.

5. The base station antenna of claim 4, wherein the base station antenna is configured to use:
   the first and third port pairs together as a first four-port set of MIMO ports in the second frequency band; and
   the second and fourth port pairs together as a second four-port set of MIMO ports in the second frequency band.

6. The base station antenna of claim 5,
   wherein the first and third port pairs are configured to transmit RF signals in a first portion of the second frequency band, and
   wherein the second and fourth port pairs are configured to transmit RF signals in a second portion of the second frequency band that is different from the first portion.

7. The base station antenna of claim 5, further comprising:
   eight beam-former ports; and
   a unit comprising a plurality of RF components that are configured to electrically connect the first through fourth vertical columns of radiating elements to the eight beam-former ports and the first and second four-port sets of MIMO ports.

8. The base station antenna of claim 7,
   wherein the plurality of RF components comprises a plurality of diplexers and a plurality of power dividers, and
   wherein the base station antenna is further configured to switch between:
   a first port configuration in which the first through fourth vertical columns of radiating elements are electrically connected to the eight beam-former ports and to the first and second four-port sets of MIMO ports; and a second port configuration in which the first through fourth vertical columns of radiating elements are electrically connected to the eight beam-former ports and only four of the MIMO ports.

9. The base station antenna of claim 1,
wherein a center of the first vertical column of radiating elements is spaced apart from a center of the second vertical column of radiating elements by a first distance, and
wherein the center of the first vertical column of radiating elements is spaced apart from a center of the third vertical column of radiating elements by a second distance that is about double the first distance.

10. The base station antenna of claim 9, further comprising:
a plurality of vertical columns of low-band radiating elements that are configured to transmit RF signals in a third frequency band that is lower than the first and second frequency bands,
wherein the first, second, third, and fourth vertical columns of radiating elements comprise first, second, third, and fourth inner vertical columns, respectively, of mid-band or high-band radiating elements that are between the plurality of vertical columns of low-band radiating elements,
wherein the first and second frequency bands comprise first and second sub-bands, respectively, of a mid-band frequency band or a high frequency band,
wherein the first distance is equal to about half of a wavelength of the first sub-band, and
wherein the second distance is equal to about 0.65-0.95 of a wavelength of the second sub-band.

11. A base station antenna comprising:
eight beam-former ports for radio frequency ("RF") signals in a first frequency band;
four multiple-input, multiple-output ("MIMO") ports for RF signals in a second frequency band that is different from the first frequency band; and
consecutive first through fourth vertical columns of radiating elements that are electrically connected to:
first through fourth port pairs, respectively, of the eight beam-former ports; and
the four MIMO ports,
wherein the first through fourth vertical columns of radiating elements are configured to transmit RF signals in the first frequency band,
wherein the first and second vertical columns of radiating elements are fed together and are further configured to transmit RF signals in the second frequency band as a first MIMO pair of consecutive vertical columns of radiating elements, and
wherein the third and fourth vertical columns of radiating elements are fed together and are further configured to transmit RF signals in the second frequency band as a second MIMO pair of consecutive vertical columns of radiating elements.

12. The base station antenna of claim 11, wherein the base station antenna is configured to operate in a MIMO mode in which the four MIMO ports are the only ports used by the first through fourth vertical columns of radiating elements in the second frequency band.

13. The base station antenna of claim 11, further comprising:
fifth through eighth MIMO ports for RF signals in the second frequency band; and
consecutive fifth through eighth vertical columns of radiating elements that are electrically connected to the fifth through eighth MIMO ports,
wherein the base station antenna is configured to operate in a MIMO mode in which the four MIMO ports and the fifth through and eighth MIMO ports are used in the second frequency band.

14. The base station antenna of claim 13,
wherein the first through fourth vertical columns of radiating elements comprise eight or fewer radiating elements per column, and
wherein the fifth through eighth vertical columns of radiating elements comprise eight or fewer radiating elements per column.

15. The base station antenna of claim 14, wherein the first through fourth vertical columns of radiating elements are above, in a vertical direction, the fifth through eighth vertical columns of radiating elements.

16. The base station antenna of claim 11,
wherein a center of the first vertical column of radiating elements is spaced apart from a center of the second vertical column of radiating elements by a first distance, and
wherein a midpoint between the first and second vertical columns of radiating elements is spaced apart from a midpoint between the third and fourth vertical columns of radiating elements by a second distance that is about double the first distance.

17. The base station antenna of claim 12, further comprising:
a unit comprising a plurality of RF components that are configured to electrically connect the first through fourth vertical columns of radiating elements to the eight beam-former ports and the four MIMO ports,
wherein the base station antenna is further configured to switch between:
a first port configuration in which the first through fourth vertical columns of radiating elements are electrically connected to the eight beam-former ports and the four MIMO ports; and
a second port configuration in which the first through fourth vertical columns of radiating elements are electrically connected to the eight beam-former ports and eight MIMO ports.

18. The base station antenna of claim 11, further comprising:
a fifth vertical column of radiating elements that is fed together with the first and second vertical columns of radiating elements; and
a sixth vertical column of radiating elements that is fed together with the third and fourth vertical columns of radiating elements.

19. A method of operating a base station antenna, the method comprising:
transmitting radio frequency ("RF") signals in a first frequency band via consecutive first, second, third, and fourth vertical columns of radiating elements, in a beam-forming mode; and
transmitting RF signals in a second frequency band that is different from the first frequency band via the first, second, third, and fourth vertical columns of radiating elements, in a multiple-input, multiple-output ("MIMO") mode, wherein the transmitting in the MIMO mode comprises:
concurrently transmitting RF signals in the second frequency band via the first and third vertical columns of radiating elements as a first MIMO pair of non-consecutive vertical columns of radiating elements, and concurrently transmitting RF signals in the second frequency band via the second and fourth vertical columns of radiating elements as a second MIMO pair of non-consecutive vertical columns of radiating elements; or
concurrently transmitting RF signals in the second frequency band via the first and second vertical columns of radiating elements fed together, and concurrently transmitting RF signals in the second frequency band via the third and fourth vertical columns of radiating elements fed together.

20. The method of claim 19,
wherein a center of the first vertical column of radiating elements is spaced apart from a center of the second vertical column of radiating elements by a first distance, and
wherein the center of the first vertical column of radiating elements is spaced apart from a center of the third vertical column of radiating elements by a second distance that is about double the first distance.

21. The method of claim 19, further comprising receiving a command to switch between first and second port configurations of the base station antenna,
wherein the concurrently transmitting via the first and third vertical columns of radiating elements and the concurrently transmitting via the second and fourth vertical columns of radiating elements are performed while using the first port configuration,
wherein the concurrently transmitting via the first and second vertical columns of radiating elements fed together and the concurrently transmitting via the third and fourth vertical columns of radiating elements fed together are performed while using the second port configuration, and
wherein, in the second frequency band, the first, second, third, and fourth vertical columns of radiating elements use only four MIMO ports of the base station antenna in the second port configuration.

* * * * *